United States Patent
Wang et al.

(10) Patent No.: US 11,967,071 B2
(45) Date of Patent: Apr. 23, 2024

(54) METHOD, DEVICE, APPARATUS, AND MEDIUM FOR TRAINING RECOGNITION MODEL AND RECOGNIZING FUNDUS FEATURES

(71) Applicant: PING AN TECHNOLOGY (SHENZHEN) CO., LTD., Guangdong (CN)

(72) Inventors: Rui Wang, Guangdong (CN); Junhuan Zhao, Guangdong (CN); Lilong Wang, Guangdong (CN); Yuanzhi Yuan, Guangdong (CN); Chuanfeng Lv, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 388 days.

(21) Appl. No.: 17/620,780

(22) PCT Filed: Nov. 11, 2019

(86) PCT No.: PCT/CN2019/116940
§ 371 (c)(1),
(2) Date: Dec. 20, 2021

(87) PCT Pub. No.: WO2021/051519
PCT Pub. Date: Mar. 25, 2021

(65) Prior Publication Data
US 2022/0414868 A1 Dec. 29, 2022

(30) Foreign Application Priority Data
Sep. 18, 2019 (CN) .................. 201910882247.3

(51) Int. Cl.
*G06T 7/00* (2017.01)
*G06N 3/045* (2023.01)
(Continued)

(52) U.S. Cl.
CPC .......... *G06T 7/0012* (2013.01); *G06N 3/045* (2023.01); *G06T 7/90* (2017.01); *G06V 10/82* (2022.01);
(Continued)

(58) Field of Classification Search
CPC ....................................................... G06T 7/00
See application file for complete search history.

(56) References Cited

U.S. PATENT DOCUMENTS

2019/0340782 A1* 11/2019 Sinha ........................ G06T 7/13
2020/0051206 A1* 2/2020 Munkberg ................ G06T 5/73

FOREIGN PATENT DOCUMENTS

| CN | 109389051 A | * | 2/2019 | |
| CN | 110309849 A | * | 10/2019 | ............... G06K 9/46 |

* cited by examiner

*Primary Examiner* — Di Xiao

(57) ABSTRACT

The present disclosure provides a method, device, computer apparatus, and storage medium for training recognition model and recognizing fundus features. The method includes: obtaining a color fundus image sample associated with a label value, inputting the color fundus image sample into a preset recognition model containing initial parameters; extracting a red channel image; inputting the red channel image into the first convolutional neural network to obtain a first recognition result and a feature image of the red channel image; combining the color fundus image sample with the feature image to generate a combined image, and inputting the combined image into the second convolutional neural network to obtain a second recognition result; obtaining a total loss value through a loss function, and when the total loss value is less than or equal to a preset loss threshold, ending the training of the preset recognition model.

19 Claims, 4 Drawing Sheets

(51) Int. Cl.
*G06T 7/90* (2017.01)
*G06V 10/82* (2022.01)
(52) U.S. Cl.
CPC ............... *G06T 2207/20081* (2013.01); *G06T 2207/20084* (2013.01); *G06T 2207/30041* (2013.01)

METHOD, DEVICE, APPARATUS, AND MEDIUM FOR TRAINING RECOGNITION MODEL AND RECOGNIZING FUNDUS FEATURES

CROSS REFERENCE OF RELATED APPLICATIONS

The present application claims the benefit of Chinese Application No. 201910882247.3, entitled "method, device, apparatus, and medium for training recognition model and recognizing fundus features," filed on Sep. 18, 2019, the entire content of which is incorporated herein in its entirety.

TECHNICAL FIELD

The present disclosure relates to image processing technologies, and more particularly, to a method, device, computer apparatus, and storage medium for training recognition model and recognizing fundus features.

BACKGROUND

Generally, since the retinal pigment epithelium has less pigment, the choroidal capillary space is blocked and the pigment increases. In addition, the transparency of the choroidal blood vessel decreases, and the capillaries become thinner and thinner. Therefore, the large and medium blood vessel structure in the choroid and the pigmented area in the vascular space can be seen through the retina, forming a texture similar to leopard skin which is also called a leopard-shaped fundus, or a textured fundus. Leopard-shaped fundus is common in young adults with high myopia. As eye diseases such as myopia are becoming more and more common, and in the prior art, there is no method for recognizing leopard-shaped fundus features that are closely related to high myopia. Therefore, there is an urgent need for a method for quickly and accurately recognizing leopard-shaped fundus features.

SUMMARY OF THE DISCLOSURE

The present disclosure provides a method, device, computer apparatus, and storage medium for training recognition model, which automatically recognizes the leopard-shaped fundus features in the color fundus image by extracting the image of the red channel, inputting the combination of the feature image output by the first convolutional neural network and the original image into the second convolutional neural network, and training the recognition model based on the total loss value output by the total loss function, which improves the accuracy of the recognition model and the efficiency and reliability of the recognition model.

A method for training recognition model, including:
obtaining a color fundus image sample associated with a label value, inputting the color fundus image sample into a preset recognition model containing initial parameters, wherein the preset recognition model includes an input unit, a first convolutional neural network, and a second convolutional neural network sequentially connected together;
    extracting a red channel image in a red channel from the color fundus image sample in the input unit;
    inputting the red channel image into the first convolutional neural network to obtain a first recognition result and a feature image of the red channel image;
    combining the color fundus image sample with the feature image to generate a combined image, and inputting the combined image into the second convolutional neural network to obtain a second recognition result;
inputting the label value, the first recognition result, and the second recognition result into a preset loss function to obtain a total loss value; wherein the loss function includes a first loss weight of the first convolutional neural network and a second loss weight of the second convolutional neural network;
when the total loss value is less than or equal to a preset loss threshold, ending the training of the preset recognition model.

A method for recognizing fundus features, including:
receiving a to-be-detected color fundus image;
inputting the to-be-detected color fundus image into a preset recognition model, and obtaining a recognition result of leopard-shaped fundus features of the to-be-detected color fundus image outputted by the preset recognition model, wherein the preset recognition model is the one trained according to the above method for training recognition model.

A device for training recognition model, including:
an obtaining module configured to obtain a color fundus image sample associated with a label value, and input the color fundus image sample into a preset recognition model containing initial parameters; wherein the preset recognition model includes an input unit, a first convolutional neural network and a second convolutional neural network sequentially connected together;
an extraction module configured to extract a red channel image in a red channel from the color fundus image sample in the input unit;
a first convolution module configured to input the red channel image into the first convolutional neural network to obtain a first recognition result and a feature image of the red channel image:
a second convolution module configured to combine the color fundus image sample with the feature image to generate a combined image, and inputting the combined image into the second convolutional neural network to obtain a second recognition result;
a calculation module configured to input the label value, the first recognition result, and the second recognition result into a preset loss function to obtain a total loss value; wherein the loss function includes a first loss weight of the convolutional neural network loss weight and a second loss weight of the second convolutional neural network;
a completion module configured to, when the total loss value is less than or equal to a preset loss threshold, end the training of the preset recognition model.

A device for recognizing fundus features, including:
a receiving module configured to receive a to-be-detected color fundus image;
a recognizing module configured to input the to-be-detected color fundus image into a preset recognition model, and obtain a recognition result of leopard-shaped fundus features of the to-be-detected color fundus image outputted by a preset recognition model, wherein the preset recognition model is the one trained according to the above method for training recognition model.

A computer apparatus includes a memory, a processor, and computer-readable instructions stored in the memory and capable of running on the processor, wherein, when being executed by the processor, the computer-readable instructions implement the above recognition training model.

A non-volatile computer-readable storage medium with computer instructions stored thereon, wherein, when being executed by a processor, the computer instructions implement the above method for training recognition model.

The realization of objectives, functional features and advantages of the present disclosure will be further described with reference to the accompanying drawings in combination with embodiments of the present disclosure.

PREFERRED EMBODIMENTS

For clearly understanding technical features, purpose, and effect of the present disclosure, embodiments are given in detail hereinafter with reference to the accompanying drawings. Obviously, the described embodiments are a part of the embodiments of the present application, not all of the embodiments. Based on the embodiments in this application, all other embodiments obtained by those of ordinary skill in the art without creative work shall fall within the protection scope of this application.

Figure 1:
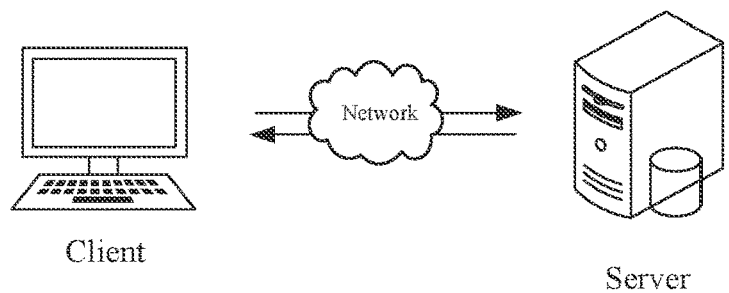
FIG. 1 is a schematic view of an application environment of a method for training recognition model in accordance with an embodiment of the present disclosure.

A method for training recognition model provided in the present disclosure can be applied in the application environment as shown in FIG. 1, wherein a client (computer equipment) communicates with a server through a network. The client (computer equipment) includes, but is not limited to, various personal computers, notebook computers, smart phones, tablet computers, cameras, and portable wearable devices. The server can be implemented as an independent server or a server cluster composed of multiple servers.

Figure 2:
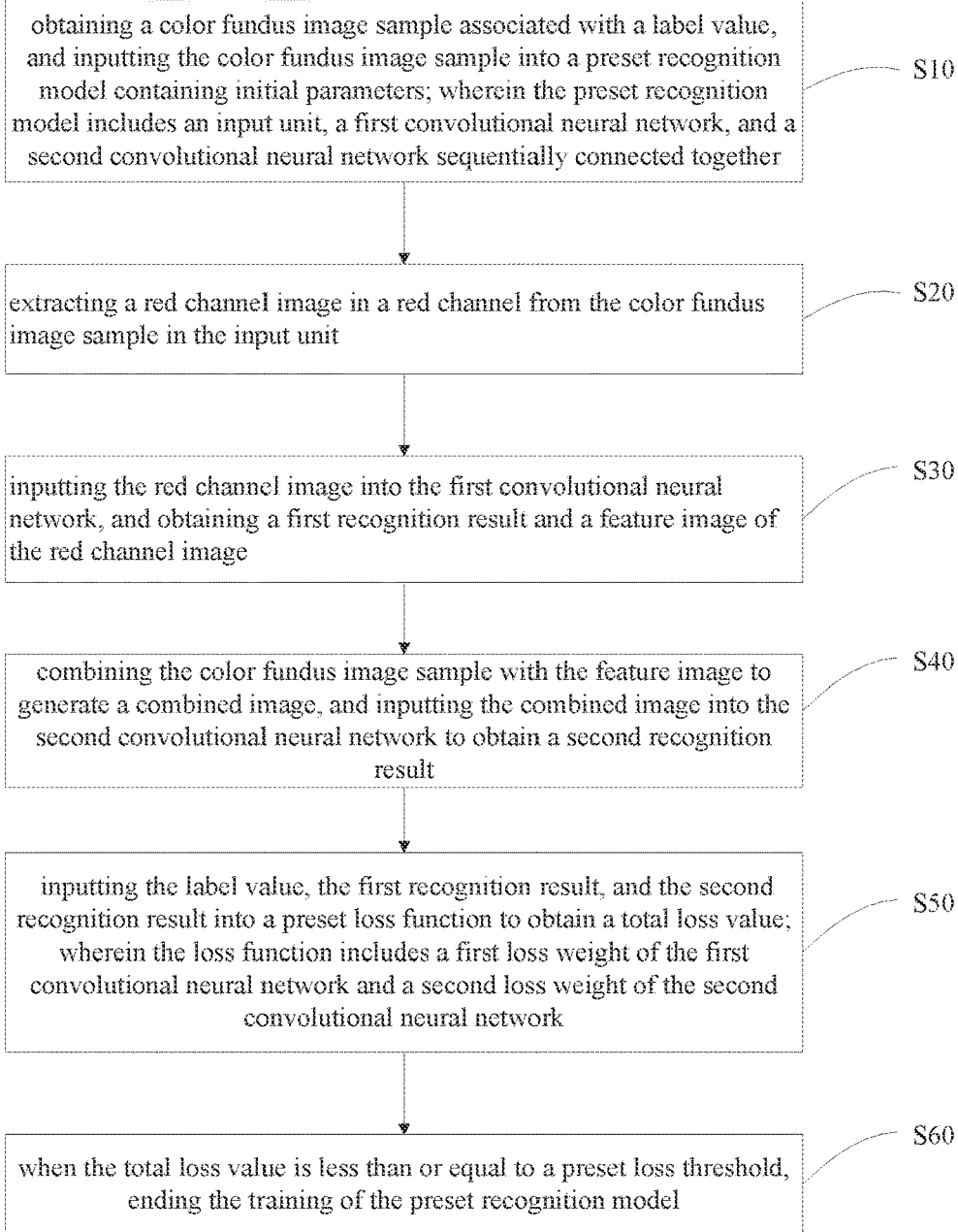
FIG. 2 is a flow chart illustrating processes of a method for training recognition model in accordance with an embodiment of the present disclosure.

In an embodiment, as shown in FIG. 2, a method for training recognition model is provided, including the following steps S10-S60.

S10, obtaining a color fundus image sample associated with a label value, and inputting the color fundus image sample into a preset recognition model containing initial parameters; wherein the preset recognition model includes an input unit, a first convolutional neural network, and a second convolutional neural network sequentially connected together.

Wherein, all the color fundus image samples are associated with the corresponding label values. For example, a color fundus image sample with leopard-like fundus features is associated with a label value (p=10000), and a color fundus image sample without leopard-shaped fundus features is associated with a label value (p=20000). A size of the color fundus image sample is set according to requirements. In an embodiment, the size of the color fundus image sample is 512×512 (a square of 512 pixels).

Understandably, the preset recognition model includes initial parameters, and includes the input unit, the first convolutional neural network, and the second convolutional neural network. The input unit is connected to the first convolutional neural network, and the first convolution neural network is connected to the second convolutional neural network.

S20, extracting a red channel image in a red channel from the color fundus image sample in the input unit.

Understandably, the color fundus image sample includes images of RGB (red, green, and blue) three channels, and the image of the red channel in the color fundus image sample is extracted and determined as the red channel image.

Figure 3:
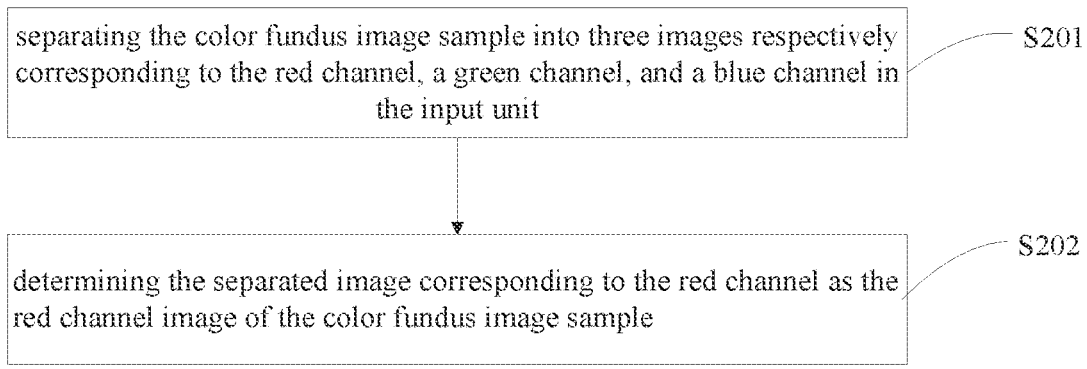
FIG. 3 is a flow chart illustrating a step S20 of the method for training recognition model in accordance with an embodiment of the present disclosure.

In one embodiment, as shown in FIG. 3, in step S20, the extracting a red channel image in a red channel from the color fundus image sample in the input unit includes steps as follows.

S201, separating the color fundus image sample into three images respectively corresponding to the red channel, a green channel, and a blue channel in the input unit.

Understandably, the color fundus image sample is separated into a red channel image, a green channel image, and a blue channel image through the input unit.

S202, determining the separated image corresponding to the red channel as the red channel image of the color fundus image sample.

Understandably, the separated image of the red channel is determined as the red channel image of the color fundus image sample. Since the leopard-shaped fundus is the texture of red leopard skin formed by the blood vessel structure, the leopard-shaped fundus features are obvious in the red channel image.

Thus, since the leopard-shaped fundus features are mainly expressed in the red channel of the color fundus image, the red channel image of the color fundus image sample is extracted for recognition, which reduces the interference from the non-red channel image on the recognition of the leopard-shaped fundus feature and improves the accuracy of the recognition model.

S30, inputting the red channel image into the first convolutional neural network, and obtaining a first recognition result and a feature image of the red channel image.

Understandably, a size of the red channel image is equal to that of the color fundus image sample. In an embodiment, the size of the red channel image is 512×512, and the red channel image is input to the first convolutional neural network. The first convolutional neural network extracts the leopard-shaped fundus features of the color fundus image sample, and obtains the first recognition result and the feature image of the red channel image. The first convolutional neural network includes a combining convolution with a 1×1 convolution kernel. The combining convolution converts an inputted multiple-channel feature image into one-channel feature image through the 1×1 convolution kernel and outputs the one-channel feature image. The one-channel feature image is masked as the feature image of the red channel image, and a size of the multiple-channel feature image is equal to that of the feature image of the red channel image.

Wherein, a network structure of the first convolutional neural network can be adjusted according to different data sets or different tasks, and the combining convolution is correspondingly added. That is, the network structure of the first convolutional neural network includes but not limited to the network structure of a several-layer convolutional neural network with multiple 1×1 convolution kernels, the Resnet50 network structure, the DenseNet121 network structure, the VGGnet network structure, and the combining convolution is correspondingly added in each type of network structure to obtain the feature image of the red channel image.

In an embodiment, the network structure of the first convolutional neural network includes the Resnet50 network structure, and a combining convolution is added and connected to the last convolution layer of the Resnet50 network structure. That is, after the red channel image (size 512×512) is inputted into the first convolutional neural network, and the feature images (the size of each feature image is 16×16) of 2048 channels are obtained through five layers of deep convolution in the first convolutional neural network including the Resnet50 network structure. Then the feature images of 512 channels are input into the combining convolution to obtain the feature image of the red channel image (the size is 16×16). The first convolutional neural network of the Resnet50 network structure extracts the leopard-shaped fundus features from the color fundus image sample, and marks the recognition result obtained by the first convolutional neural network as the first recognition result.

In another embodiment, the network structure of the first convolutional neural network includes five layers and each layer has 64 1×1 convolution kernels, and a combining convolution is added and connected to the last convolution layer. That is, after the red channel image (the size is 512×512) is inputted into the first convolutional neural network, the feature images of 64 channels are obtained through five layers of deep convolution of the first convolutional neural network. Then the feature images of 64 channels are inputted to the combining convolution to obtain the feature image of the red channel image (the size is 512×512). The first convolutional neural network with the network structure having 5 layers each layer of which has 64 1×1 convolution kernels extracts the leopard-shaped fundus features from the color fundus image sample, and marks the recognition result obtained by the first convolutional neural network as the first recognition result.

In this way, the multi-channel feature image can be converted into the one-channel feature image through the combining convolution, and the extracted leopard-shaped fundus features are summarized to strengthen the leopard-shaped fundus features and the feature image of the red channel image is provided.

S40, combining the color fundus image sample with the feature image to generate a combined image, and inputting the combined image into the second convolutional neural network to obtain a second recognition result.

Understandably, the color fundus image sample including the RGB three channels is combined with the feature image (one channel) of the red channel image to generate the combined image of four channels. The combined image is inputted to the second convolutional neural network, and the second convolutional neural network extracts the leopard-shaped fundus features of the combined image to obtain the second recognition result. The network structure of the second convolutional neural network can be adjusted according to different data sets or different tasks, that is, the network structure of the second convolutional neural network includes but not limited to the Resnet50 network structure, the DenseNet121 network structure, the VGGnet network structure. The color fundus image sample can be combined with the feature image in a splicing way or in an overlapping way. In an embodiment, the color fundus image sample is combined with the feature image in the overlapping way.

In this embodiment, the leopard-shaped fundus features can be strengthened and highlighted through combining the color fundus image sample with the feature image of the red channel image in an overlapping way, which improves the efficiency and reliability of the recognition model and improves the accuracy of the recognition model.

Figure 4:
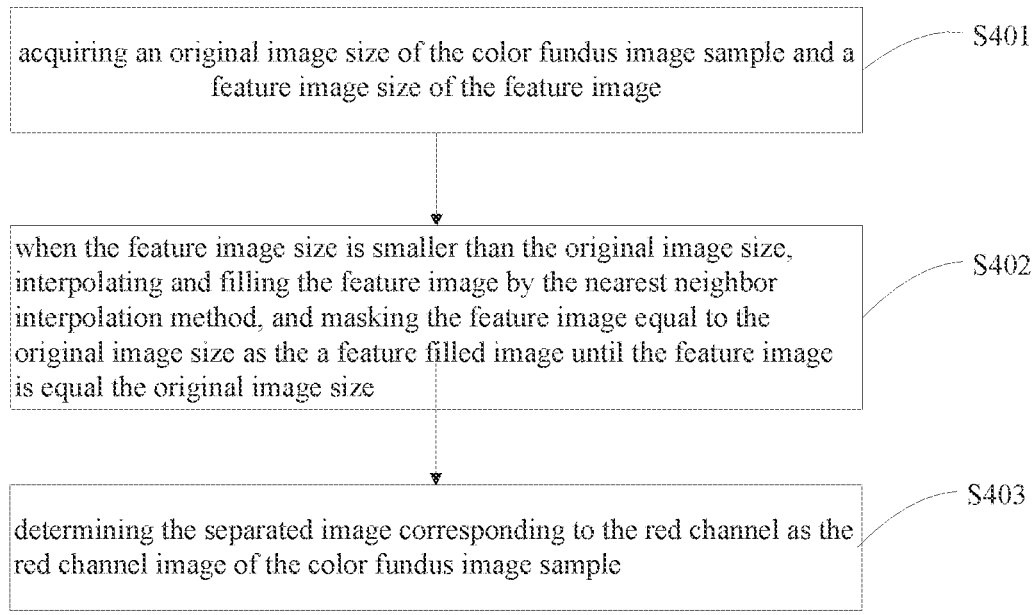
FIG. 4 is a flow chart illustrating a step S40 of the method for training recognition model in accordance with an embodiment of the present disclosure.

In one embodiment, as shown in FIG. 4, the step S40, that is, the combining the color fundus image sample with the feature image to generate a combined image includes steps as follows.

S401, acquiring an original image size of the color fundus image sample and a feature image size of the feature image.

Understandably, the original image size of the color fundus image sample can be obtained, for example, the original image size of the color fundus image sample can be 512×512, and the feature image size of the feature image can be obtained, for example, the feature image size of the red channel image is 16×16.

S402, when the feature image size is smaller than the original image size, interpolating and filling the feature image by the nearest neighbor interpolation method, and masking the feature image equal to the original image size as a feature filled image until the feature image is equal the original image size.

Understandably, when the feature image size is smaller than the original image size, for example, the feature image size of the red channel image being 16×16 is smaller than the original image size being 512×512 of the color fundus image sample. The feature image is interpolated and filled by the nearest neighbor interpolation method until the feature image is equal to the original image size, that is, the feature image is interpolated and filled to have a size of 52×512, and is marked as the feature filled image. In this way, the value of each corresponding pixel point is used as the value of the neighbor pixel point of the corresponding pixel point after rapid filling and expansion without any calculation, wherein the values of the neighbor pixel points of each corresponding pixel point after the filling and expansion do not overlap and interfere with each other.

S403, combining the color fundus image sample and the feature filling image to generate the combined image.

Understandably, the combined image includes the color fundus image sample and the feature filled image, that is, the combined image includes the image of the red channel in the color fundus image sample, a red channel image in the green channel in the color fundus image sample, a red channel image in the blue channel in the color fundus image sample, and the feature filled image. And s size of the combined image is equal to that of the color fundus image sample.

Figure 5:
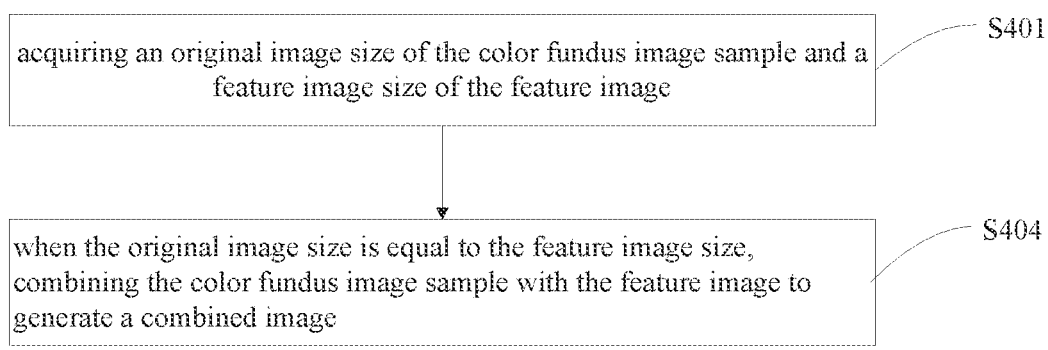
FIG. 5 is a flow chart illustrating a step S40 of the method for training recognition model in accordance with another embodiment of the present disclosure.

In another embodiment, as shown in FIG. 5, after the step S401, that is, after the obtaining the original image size of the color fundus image sample and the feature image size of the feature image, the method further includes the following steps.

S404, when the original image size is equal to the feature image size, combining the color fundus image sample with the feature image to generate a combined image.

In this embodiment, the original image size of the color fundus image sample is acquired, for example, the original image size of the color fundus image sample is 512×512, and the feature image size of the feature image is acquired, for example, the feature image size of the red channel image is 512×512. When the original image size is equal to the feature image size, the color fundus image sample and the feature image are directly combined to generate the combined image in an overlapping way. That is, the combined image includes the image in the red channel in the color fundus image sample, the red channel image in the green channel in the color fundus image sample, the red channel image in the blue channel in the color fundus image sample, and the feature image, and the size of the combined image is equal to the size of the color fundus image sample.

S50, inputting the label value, the first recognition result, and the second recognition result into a preset loss function to obtain a total loss value; wherein the loss function includes a first loss weight of the first convolutional neural network and a second loss weight of the second convolutional neural network.

Understandably, the total loss value of the preset recognition model can be obtained by setting the first loss weight of the first convolutional neural network and the second loss weight of the second convolutional neural network, and by inputting the label value, the first recognition result, and the second recognition result into the preset loss function.

In an embodiment, in the step S50, the preset loss function is:

$$L = w_1 \times \Sigma p \log q_1 + w_2 \times \Sigma p \log q_2$$

wherein:
p is the label value of the color fundus image;
$q_1$ is the first recognition result;
$q_2$ is the second recognition result;
$w_1$ is the first loss weight of the first convolutional neural network; and
$w_2$ is the second loss weight of the second convolutional neural network.

Understandably, the first loss weight of the first convolutional neural network and the second loss weight of the second convolutional neural network are in the range of 0 to 1, and the sum of the first loss weight and the second loss weight is 1. In an embodiment, the second loss weight can be 0.6 and the first loss weight can be 0.4, which means that the recognition result of the second convolutional neural network accounts for the main weight, and the recognition result of the first convolutional neural network accounts for the secondary weight.

S60, when the total loss value is less than or equal to a preset loss threshold, ending the training of the preset recognition model.

That is, when the total loss value calculated by the preset loss function is less than or equal to the preset loss threshold, for example, if the preset loss threshold is 0.001, when the total loss value is less than or equal to 0.001, the training of the preset recognition model is ended. At this time, the initial parameters of the preset recognition model do not need to be updated iteratively.

In the present disclosure, the color fundus image sample associated with the label value is obtained and inputted into the preset recognition model. The preset recognition model includes the input layer unit, the first convolutional neural network, and the second convolutional neural network sequentially connected together. The red channel image in the red channel in the color fundus image sample is extracted and inputted to the first convolutional neural network to obtain the first recognition result and the feature image of the red channel image. The color fundus image sample and the feature image are combined to generate the combined image, and the combined image is inputted into the second convolutional neural network to obtain the second recognition result. The label value, the first recognition result, and the second recognition result are inputted into the preset loss function to obtain the total loss value; when the total loss value is less than or equal to the preset loss threshold, the training of the preset recognition model is ended. In this way, the accuracy of the recognition model is improved by extracting the image of the red channel, inputting the combination of the feature image output by the first convolutional neural network and the original image into the second convolutional neural network, and by training the recognition model based on the total loss value output by the total loss function, which also improves the efficiency and reliability of the recognition model.

In another embodiment, after the step S50, that is, after the inputting the label value, the first recognition result, and the second recognition result into a preset loss function to obtain a total loss value, the method further includes the following steps.

S70, when the total loss value is greater than the preset loss threshold, iteratively updating the initial parameters of the preset recognition model, and ending the training of the preset recognition model until the total loss value is less than or equal to the preset loss threshold.

Wherein, the iteratively updating the initial parameters of the preset recognition model refers to matching different total loss function optimization algorithms to calculate parameter values according to different ranges of the total loss value and updating the initial parameters of the preset recognition model according to the parameter values. In this way, the initial parameters of the preset recognition model are iteratively updated through the total loss function optimization algorithm, which improves the efficiency of the recognition model.

The present disclosure further provides a method for recognizing fundus features which can be applied in the application environment as shown in FIG. 1. A client (computer apparatus) communicates with a server through a network. The client includes but is not limited to, various personal computers, notebook computers, smart phones, tablet computers, cameras, and portable wearable devices. The server can be implemented as an independent server or a server cluster composed of multiple servers.

Figure 6:
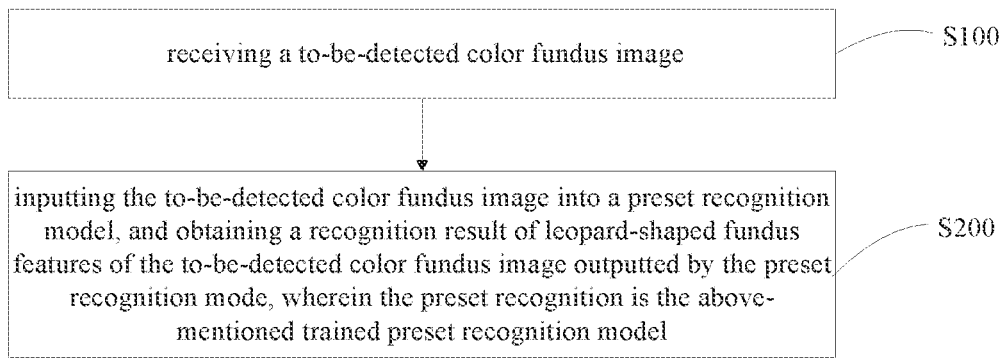
FIG. 6 is a flow chart illustrating processes of a method for recognizing fundus features in accordance with an embodiment of the present disclosure.

In an embodiment, a method for recognizing fundus features is provided, as shown in FIG. 6, including the following steps.

S100, receiving a to-be-detected color fundus image.

For example, if an original image size of the color fundus image sample is 512×512, a size of the to-be-detected color fundus image can be 512×512, and the to-be-detected color fundus image includes images of RGB three channels.

S200, inputting the to-be-detected color fundus image into a preset recognition model, and obtaining a recognition result of leopard-shaped fundus features of the to-be-detected color fundus image outputted by the preset recognition mode, wherein the preset recognition is the above-mentioned trained preset recognition model.

Understandably, the recognition result of the leopard-shaped fundus features of the image can be outputted by inputting the to-be-detected color fundus image into the trained preset recognition model. The recognition result can be set according to requirements, for example, the recognition result can be displayed as both text and probability. For example, the probability that the recognition result is output as leopard-shaped fundus features is 95.5%. In this way, the leopard-shaped fundus features of the color fundus image are automatically, quickly and accurately recognized.

Figure 7:
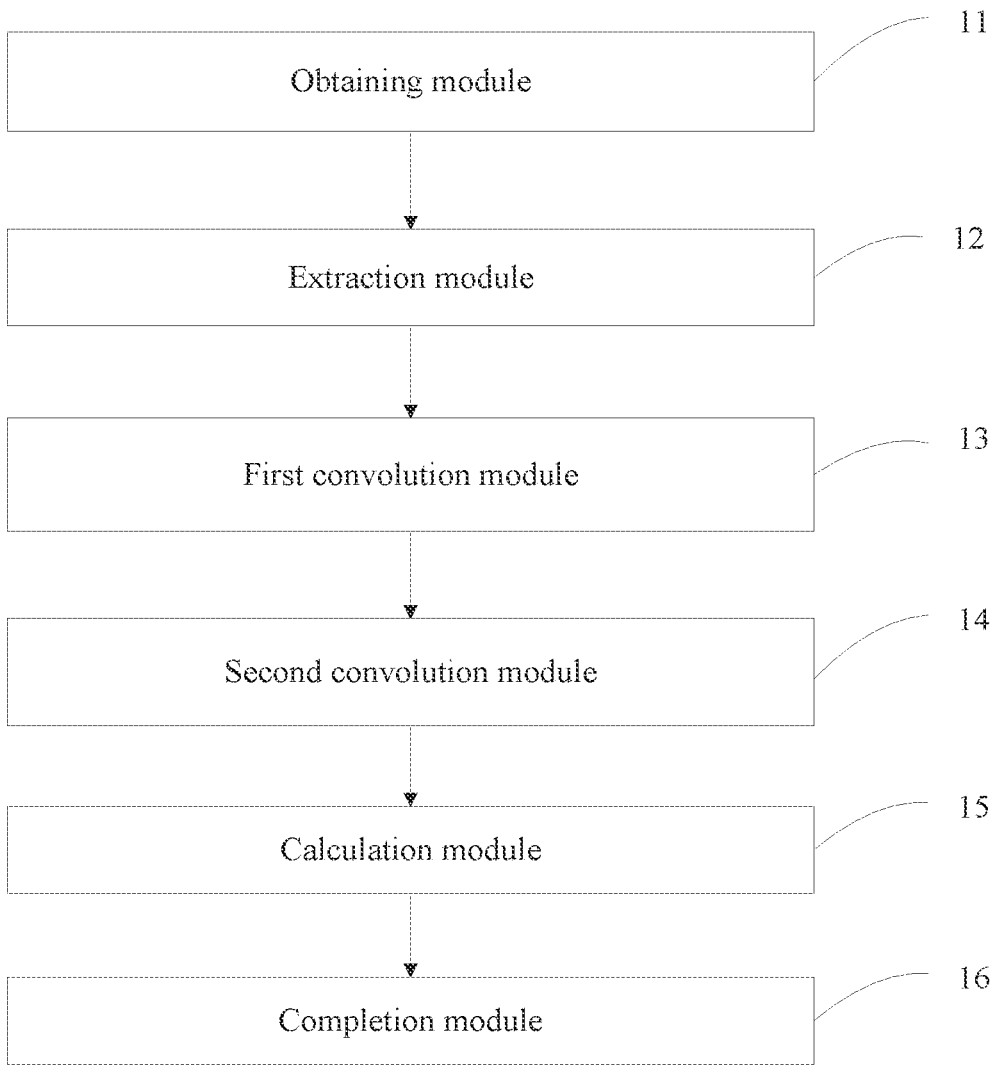
FIG. 7 is a functional block diagram of a device for training recognition model in accordance with an embodiment of the present disclosure.

In one embodiment, a device for training recognition model is provided, and the device for training recognition model respectively corresponds to the method for training recognition model in the above-mentioned embodiment. As shown in FIG. 7, the device for training recognition model includes an obtaining module 11, an extraction module 12, a first convolution module 13, a second convolution module 14, a calculation module 15, and a completion module 16. The detailed description of each functional module is as follows.

The obtaining module 11 is configured to obtain a color fundus image sample associated with a label value, and input the color fundus image sample into a preset recognition model containing initial parameters; wherein the preset recognition model includes an input unit, a first convolutional neural network and a second convolutional neural network sequentially connected together.

The extraction module 12 is configured to extract a red channel image in a red channel from the color fundus image sample in the input unit.

The first convolution module 13 is configured to input the red channel image into the first convolutional neural network to obtain a first recognition result and a feature image of the red channel image.

The second convolution module 14 is configured to combine the color fundus image sample with the feature image to generate a combined image, and input the combined image into the second convolutional neural network to obtain a second recognition result.

The calculation module 15 is configured to input the label value, the first recognition result, and the second recognition result into a preset loss function to obtain a total loss value; wherein the loss function includes a first loss weight of the first convolutional neural network and a second loss weight of the second convolutional neural network.

The completion module 16 is configured to end the training of the preset recognition model when the total loss value is less than or equal to a preset loss threshold.

For the specific limitation of the device for training recognition model, please refer to the above limitation of the method for training recognition model, which will not be repeated here. Each module in the above device for training recognition model can be implemented in whole or in part by software, hardware, and a combination thereof. The above-mentioned modules may be embedded in the form of hardware or independent of the processor in the computer equipment, or may be stored in the memory of the computer apparatus in the form of software, so that the processor can call and execute the operations corresponding to the above-mentioned modules.

Figure 8:
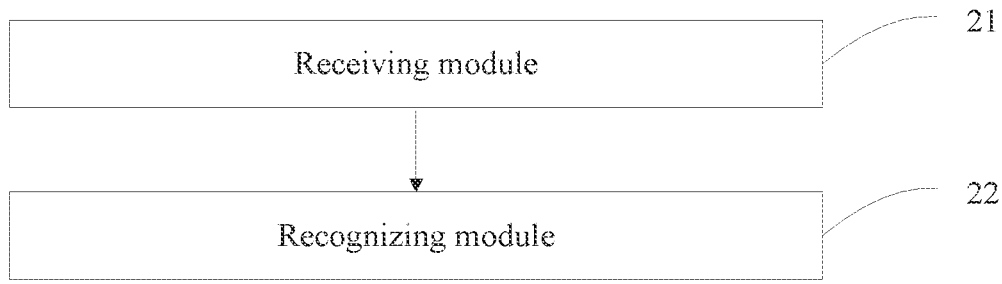
FIG. 8 is a functional block diagram of a device for recognizing fundus features in accordance with an embodiment of the present disclosure.

In one embodiment, a device for recognizing fundus features is provided, and the device for recognizing fundus features respectively corresponds to the method for recognizing fundus features in the above-mentioned embodiment. As shown in FIG. 8, the device for recognizing fundus features includes a receiving module 21 and a recognizing module 22. The detailed description of each functional module is as follows.

The receiving module 21 is configured to receive a to-be-detected color fundus image.

The recognizing module 22 is configured to input the to-be-detected color fundus image into a preset recognition model, and obtain a recognition result of the leopard-shaped fundus features of the to-be-detected color fundus image output by a preset recognition model, wherein the preset recognition model is the one trained according to the method in the above-mentioned embodiments.

For the specific definition of the device for recognizing fundus features, please refer to the above definition of the method for recognizing fundus features, which will not be repeated here. Each module in the above-mentioned device for recognizing fundus features can be implemented in whole or in part by software, hardware, and a combination thereof. The above-mentioned modules may be embedded in the form of hardware or independent of the processor in the computer equipment, or may be stored in the memory of the computer equipment in the form of software, so that the processor can call and execute the operations corresponding to the above-mentioned modules.

Figure 9:
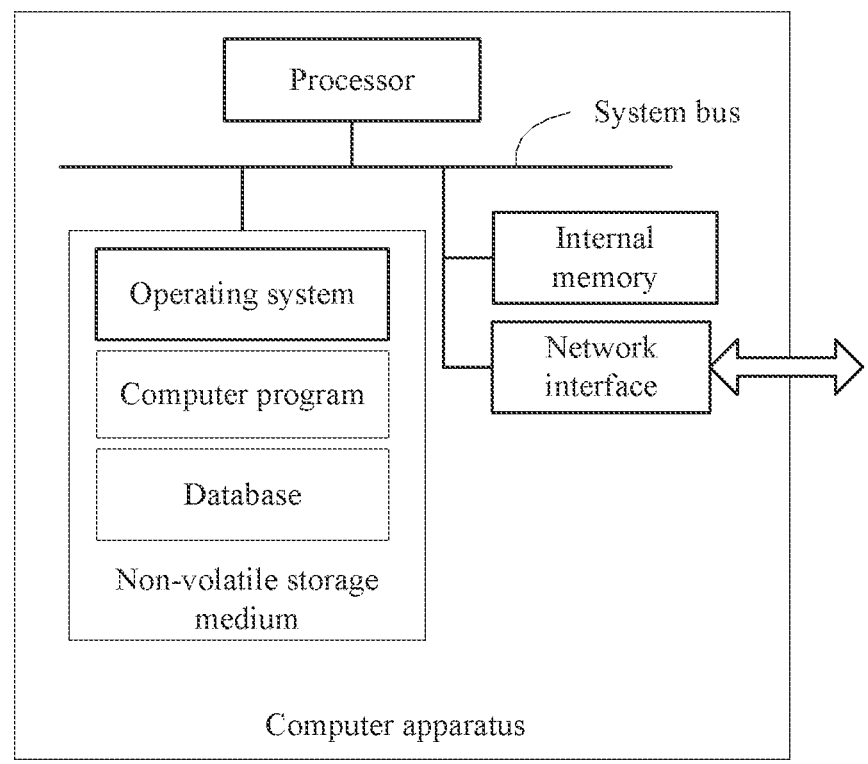
FIG. 9 is a schematic view of a computer apparatus in accordance with an embodiment of the present disclosure.

In one embodiment, a computer apparatus is provided. The computer apparatus may be a server, and an internal structure of the server may be as shown in FIG. 9. The computer apparatus includes a processor, a memory, a network interface, and a database connected through a system bus. The processor is used to provide calculation and control capabilities. The memory includes a readable storage medium and an internal memory. The readable storage medium stores an operating system, computer-readable instructions, and a database. The internal memory provides an environment for the operation of an operating system and computer-readable instructions in the readable storage medium. The network interface is used to communicate with an external terminal through a network connection. The computer-readable instructions are executed by the processor to implement a method for training recognition model, or to implement a method for recognizing fundus features. In one embodiment, a computer apparatus is provided, including a memory, a processor, and computer-readable instructions stored in the memory and capable of running on the processor. The processor executes the computer-readable instructions to implement the method for training recognition model, or to implement the method for recognizing fundus features in the above-mentioned embodiments.

In one embodiment, a non-volatile computer-readable storage medium is provided, and computer instructions are stored thereon. When being executed by a processor, the computer instructions implement the above-mentioned method for training recognition model, or the above-mentioned method for recognizing fundus features.

A person of ordinary skill in the art can understand that all or part of the processes in the method of the foregoing embodiments can be implemented by instructing relevant hardware through a computer program. The computer program can be stored in a non-volatile computer readable storage. When the computer program is executed, the process of the method of the above embodiments can be implemented. Wherein, any reference to memory, storage, database or other media used in the embodiments provided in this application may include non-volatile and/or volatile memory. Non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain Channel (Synchlink) DRAM (SLDRAM), memory bus (Rambus) direct RAM (RDRAM), direct memory bus dynamic RAM (DRDRAM), and memory bus dynamic RAM (RDRAM), etc.

A person of ordinary skill in the art can clearly understand that, for the convenience and conciseness of description, the division of the above functional units and modules are only used as an example. In practical applications, the above functions can be implemented by different functional units and modules as needed. That is, the internal structure of the device is divided into different functional units or modules to complete all or part of the functions described above.

The contents described above are only preferred embodiments of the present disclosure, but the scope of the present disclosure is not limited to the embodiments. Any ordinarily skilled in the art would make any modifications or replacements to the embodiments in the scope of the present disclosure, and these modifications or replacements should be included in the scope of the present disclosure. Thus, the scope of the present disclosure should be subjected to the claims.

What is claimed is:

1. A method for training recognition model, comprising:
obtaining a color fundus image sample associated with a label value, inputting the color fundus image sample into a preset recognition model containing initial parameters, wherein the preset recognition model comprises an input unit, a first convolutional neural network, and a second convolutional neural network sequentially connected together;
extracting a red channel image in a red channel from the color fundus image sample in the input unit;
inputting the red channel image into the first convolutional neural network to obtain a first recognition result and a feature image of the red channel image;
combining the color fundus image sample with the feature image to generate a combined image, and inputting the combined image into the second convolutional neural network to obtain a second recognition result;
inputting the label value, the first recognition result, and the second recognition result into a preset loss function to obtain a total loss value; wherein the loss function comprises a first loss weight of the first convolutional neural network and a second loss weight of the second convolutional neural network;
when the total loss value is less than or equal to a preset loss threshold, ending the training of the preset recognition model.

2. The method of claim 1, wherein after the inputting the label value, the first recognition result, and the second recognition result into a preset loss function to obtain a total loss value, the method further comprises:
when the total loss value is greater than the preset loss threshold, iteratively updating the initial parameters of the preset recognition model, and ending the training of the recognition model until the total loss value is less than or equal to the preset loss threshold.

3. The method of claim 1, wherein the extracting a red channel image in a red channel from the color fundus image sample in the input unit comprises:
separating the color fundus image into three images respectively corresponding to the red channel, a green channel and a blue channel in the input unit; and
determining the separated image corresponding to the red channel as the red channel image of the color fundus image sample.

4. The method of claim 1, wherein the combining the color fundus image sample with the feature image to generate a combined image comprises:
acquiring an original image size of the color fundus image sample and a feature image size of the feature image;
when the feature image size is less than the original image size, interpolating and filling the feature image by a nearest neighbor interpolation method; masking the feature image equal to the original image size as a feature filled image until the feature image is equal to the original image size;
combining the color fundus image sample with the feature filled image to generate the combined image; and
when the original image size is equal to the feature image size, combing the color fundus image sample with the feature image to generate the combined image.

5. The method of claim 1, wherein the preset loss function is:

$$L = w_1 \times \Sigma p \log q_1 + w_2 \times \Sigma p \log q_2$$

wherein:
p is the label value of the color fundus image;
$q_1$ is the first recognition result;
$q_2$ is the second recognition result;
$w_1$ is the first loss weight of the first convolutional neural network; and
$w_2$ is the second loss weight of the second convolutional neural network.

6. A method for recognizing fundus features, comprising:
receiving a to-be-detected color fundus image;
inputting the to-be-detected color fundus image into a preset recognition model, and obtaining a recognition result of leopard-shaped fundus features of the to-be-detected color fundus image outputted by the preset recognition model, wherein the preset recognition model is the one trained according to the method for training recognition model of claim 1.

7. A device for recognizing fundus features, comprising:
a receiving module configured to receive a to-be-detected color fundus image;
A recognizing module configured to input the to-be-detected color fundus image into a preset recognition model, and obtain a recognition result of leopard-shaped fundus features of the to-be-detected color fundus image outputted by a preset recognition model, wherein the preset recognition model is the one trained according to the method for training recognition model of claim 1.

8. A computer apparatus, comprising a memory, a processor, and computer-readable instructions stored in the memory and capable of running on the processor, wherein, when being executed by the processor, the computer-readable instructions implement the following steps:
receiving a to-be-detected color fundus image and obtaining a recognition result of leopard-shaped fundus feature of the to-be-detected color fundus image outputted by a preset recognition model, wherein the preset recognition model is the one trained according to the method for training recognition model of claim 1.

9. A non-volatile computer-readable storage medium with computer instructions stored thereon, wherein, when being executed by a processor, the computer instructions implement a method for recognizing fundus features which comprises:

receiving a to-be-detected color fundus image;
inputting the to-be-detected color fundus image into a preset recognition model, and obtaining a recognition result of leopard-shaped fundus features of the to-be-detected color fundus image outputted by the preset recognition model, wherein the preset recognition model is the one trained according to the method for training recognition model of claim 1.

10. A computer apparatus, comprising a memory, a processor, and computer-readable instructions stored in the memory and capable of running on the processor, wherein, when being executed by the processor, the computer-readable instructions implement the following steps:
    obtaining a color fundus image sample associated with a label value, inputting the color fundus image sample into a preset recognition model containing initial parameters, wherein the preset recognition model comprises an input unit, a first convolutional neural network, and a second convolutional neural network sequentially connected together;
    extracting a red channel image in a red channel from the color fundus image sample in the input unit;
    inputting the red channel image into the first convolutional neural network to obtain a first recognition result and a feature image of the red channel image;
    combining the color fundus image sample with the feature image to generate a combined image, and inputting the combined image into the second convolutional neural network to obtain a second recognition result;
    inputting the label value, the first recognition result, and the second recognition result into a preset loss function to obtain a total loss value; wherein the loss function comprises a first loss weight of the convolutional neural network and a second loss weight of the second convolutional neural network;
    when the total loss value is less than or equal to a preset loss threshold, ending the training of the preset recognition model.

11. The computer apparatus of claim 10, wherein after the inputting the label value, the first recognition result, and the second recognition result into a preset loss function to obtain a total loss value, the computer-readable instructions further implement that following steps when being executed by the processor:
    when the total loss value is greater than the preset loss threshold, iteratively updating the initial parameters of the preset recognition model, and ending the training of the recognition model until the total loss value is less than or equal to the preset loss threshold.

12. The computer apparatus of claim 10, wherein the extracting a red channel image in a red channel from the color fundus image sample in the input unit comprises:
    separating the color fundus image into three images respectively corresponding to the red channel, a green channel and a blue channel in the input unit; and
    determining the separated image corresponding to the red channel as the red channel image of the color fundus image sample.

13. The computer apparatus of claim 10, wherein the combining the color fundus image sample with the feature image to generate a combined image comprises:
    acquiring an original image size of the color fundus image sample and a feature image size of the feature image;
    when the feature image size is smaller than the original image size, interpolating and filling the feature image by a nearest neighbor interpolation method; masking the feature image equal to the original image size as a feature filled image until the feature image is equal to the original image size;
    combining the color fundus image sample with the feature filled image to generate the combined image;
    when the original image size is equal to the feature image size, combing the color fundus image sample with the feature image to generate the combined image.

14. The computer apparatus of claim 10, wherein the preset loss function is:

$$L = w_1 \times \Sigma p \log q_1 + w_2 \times \Sigma p \log q_2$$

wherein:
p is the label value of the color fundus image;
$q_1$ is the first recognition result;
$q_2$ is the second recognition result;
$w_1$ is the first loss weight of the first convolutional neural network; and
$w_2$ is the second loss weight of the second convolutional neural network.

15. A non-volatile computer-readable storage medium with computer instructions stored thereon, wherein, when being executed by a processor, the computer instructions implement a method for training recognition model comprising:
    obtaining a color fundus image sample associated with a label value, inputting the color fundus image sample into a preset recognition model containing initial parameters, wherein the preset recognition model comprises an input unit, a first convolutional neural network, and a second convolutional neural network sequentially connected together;
    extracting a red channel image in a red channel from the color fundus image sample in the input unit;
    inputting the red channel image into the first convolutional neural network to obtain a first recognition result and a feature image of the red channel image;
    combining the color fundus image sample with the feature image to generate a combined image, and inputting the combined image into the second convolutional neural network to obtain a second recognition result;
    inputting the label value, the first recognition result, and the second recognition result into a preset loss function to obtain a total loss value; wherein the loss function comprises a first loss weight of the convolutional neural network and a second loss weight of the second convolutional neural network;
    when the total loss value is less than or equal to a preset loss threshold, ending the training of the preset recognition model.

16. The non-volatile computer-readable storage medium of claim 15, wherein after the inputting the label value, the first recognition result, and the second recognition result into a preset loss function to obtain a total loss value, the method for training recognition model further comprises:
    when the total loss value is greater than the preset loss threshold, iteratively updating the initial parameters of the preset recognition model, and ending the training of the recognition model until the total loss value is less than or equal to the preset loss threshold.

17. The non-volatile computer-readable storage medium of claim 15, wherein the extracting a red channel image in a red channel from the color fundus image sample in the input unit comprises:
    separating the color fundus image into three images respectively corresponding to the red channel, a green channel and a blue channel in the input unit; and determining the separated image corresponding to the red channel as the red channel image of the color fundus image sample.

18. The non-volatile computer-readable storage medium of claim 15, wherein the combining the color fundus image sample with the feature image to generate a combined image comprises:
acquiring an original image size of the color fundus image sample and a feature image size of the feature image;
when the feature image size is smaller than the original image size, interpolating and filling the feature image by a nearest neighbor interpolation method; masking the feature image equal to the original image size as a feature filled image until the feature image is equal to the original image size;
combining the color fundus image sample with the feature filled image to generate a combined image;
when the original image size is equal to the feature image size, combing the color fundus image sample with the feature image to generate the combined image.

19. The non-volatile computer-readable storage medium of claim 15, wherein the preset loss function is:

$$L = w_1 \times \Sigma p \log q_1 + w_2 \times \Sigma p \log q_2$$

wherein:
p is the label value of the color fundus image;
$q_1$ is the first recognition result;
$q_2$ is the second recognition result;
$w_1$ is the first loss weight of the first convolutional neural network; and
$w_2$ is the second loss weight of the second convolutional neural network.

* * * * *